United States Patent
Igarashi et al.

(10) Patent No.: US 9,453,587 B2
(45) Date of Patent: Sep. 27, 2016

(54) FLOW RATE ADJUSTING DEVICE

(71) Applicant: SURPASS INDUSTRY CO., LTD., Saitama (JP)

(72) Inventors: Hiroki Igarashi, Saitama (JP); Atsushi Inoue, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 185 days.

(21) Appl. No.: 14/090,144

(22) Filed: Nov. 26, 2013

(65) Prior Publication Data

US 2014/0145099 A1    May 29, 2014

(30) Foreign Application Priority Data

Nov. 29, 2012  (JP) ................................ 2012-261444

(51) Int. Cl.
| | |
|---|---|
| *F16K 31/44* | (2006.01) |
| *F16K 31/12* | (2006.01) |
| *G05D 16/18* | (2006.01) |
| *G05D 16/20* | (2006.01) |

(52) U.S. Cl.
CPC .............. *F16K 31/44* (2013.01); *F16K 31/12* (2013.01); *G05D 16/185* (2013.01); *G05D 16/2086* (2013.01)

(58) Field of Classification Search
CPC ..... F16K 31/44; F16K 31/12; G05D 7/0193; G05D 7/0153; G05D 16/185; G05D 16/2086
USPC .......... 251/89, 96, 95, 94, 101; 70/175, 177, 70/179
See application file for complete search history.

(56) References Cited

U.S. PATENT DOCUMENTS

| | | | | | |
|---|---|---|---|---|---|
| 2,748,589 | A | * | 6/1956 | Hulslander | ..................... 70/180 |
| 3,344,805 | A | * | 10/1967 | Wapner | ......................... 137/486 |
| 4,572,239 | A | * | 2/1986 | Koch et al. | ............. 137/625.47 |
| 4,926,900 | A | * | 5/1990 | Pietras | ......................... 137/385 |
| 5,244,008 | A | * | 9/1993 | Bauer | ......................... 137/385 |
| 5,799,687 | A | * | 9/1998 | Eckel et al. | ................. 137/385 |
| 6,932,318 | B2 | * | 8/2005 | Igarashi | ............. F16K 31/1221 251/60 |
| 7,207,198 | B2 | * | 4/2007 | Benda | .............................. 70/19 |
| 7,404,543 | B2 | * | 7/2008 | Weston et al. | ................ 251/305 |
| 8,740,180 | B2 | * | 6/2014 | Matsushita et al. | .......... 251/109 |
| 9,010,722 | B2 | * | 4/2015 | Hoots et al. | .................. 251/109 |

FOREIGN PATENT DOCUMENTS

| | | |
|---|---|---|
| JP | 2004-36765 | 2/2004 |
| JP | 2008-069936 A | 3/2008 |
| JP | 2008-232382 A | 10/2008 |
| WO | 03/019060 A1 | 3/2003 |

* cited by examiner

*Primary Examiner* — Marina Tietjen
*Assistant Examiner* — Daphne M Barry
(74) *Attorney, Agent, or Firm* — Greenblum & Bernstein, P.L.C.

(57) ABSTRACT

The flow rate adjusting device includes: a valve body disposed so as to open and close the fluid passage; a dial operation part which adjusts minute opening of the valve body in the slow-leaking mechanism; a lock nut part which fixes the adjusting position of the minute opening; and a lock cap which prevents motion of the dial operation part and the lock nut part. The lock cap includes: a first insertion hole into which the substantially cylindrical dial operation part is inserted; a second insertion hole into which a rod protruding upward from the housing is inserted; and an arm part which connects the first insertion hole and the second insertion hole.

3 Claims, 6 Drawing Sheets

FIG. 4
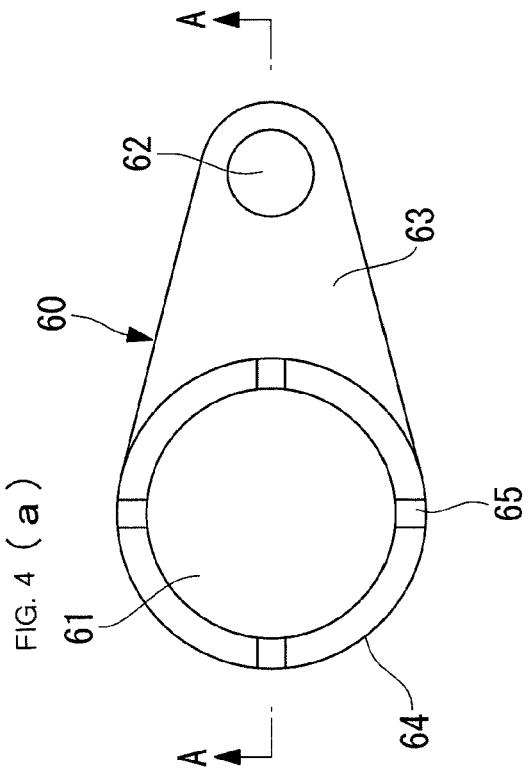
FIG. 4 (a)
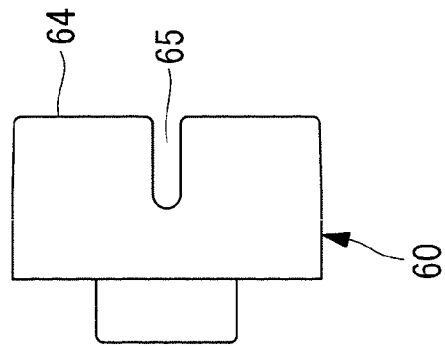
FIG. 4 (b)
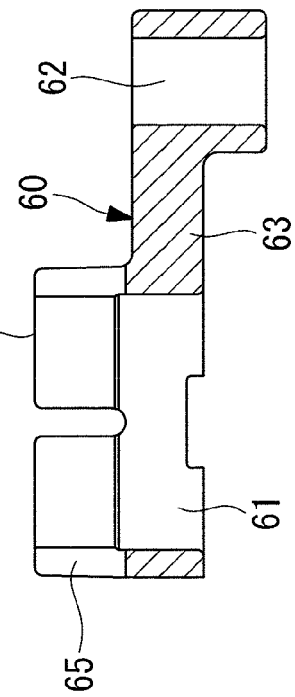
FIG. 4 (c)

FLOW RATE ADJUSTING DEVICE

TECHNICAL FIELD

The present invention relates to a flow rate adjusting device which controls, for example, flow rate of chemicals, demineralized water or the like, and particularly to a flow rate adjusting device which includes a slow-leaking mechanism.

BACKGROUND ART

Conventionally, a flow rate adjusting device is known which is used in a fluid supply line in cases such as when mixing multiple chemicals together or accurately adjusting flow rate of demineralized water, etc. used in a manufacturing process of products, and which is also commonly called a regulator. Examples of the flow rate adjusting device used for such purposes include one with a configuration disclosed in Patent Literature 1 below.

Some of these flow rate adjusting devices include a slow-leaking mechanism which secures minute opening in a fully-closed state. In order to enable the adjustment of the minute opening of a valve mechanism for different purposes, the slow-leaking mechanism includes a stroke adjusting mechanism. This stroke adjusting mechanism is, for example, configured to be able to appropriately adjust a protrusion amount of a valve stem, etc. which actuates a valve body in an opening direction.

Further, the aforementioned stroke adjusting mechanism includes a stopper mechanism which fixes an adjusting position so as to prevent the set adjusting position from shifting. Typically, this stopper mechanism has a structure of a double-nut system, for example, which is screwed to an upper end of the valve stem.

CITATION LIST

Patent Literature

{PTL 1}
Japanese Unexamined Patent Application, Publication No. 2004-36765

SUMMARY OF INVENTION

Technical Problem

In the slow-leaking mechanism of the above-described flow rate adjusting device, an inability to maintain a subtle adjusting position of the stroke adjusting mechanism makes it difficult to accurately adjust the flow rate of slow leakage due to shifts in the adjusting position. Therefore, it is desirable that the stroke adjusting mechanism and the stopper mechanism of the flow rate adjusting device are configured so as not to be easily operated by a worker, nor to undergo shifts due to vibration, etc.

To be more specific, development of a flow rate adjusting device is desired, which is less likely to undergo such unintentional shifts in an adjusting position as affect the flow rate adjusting function, including a shift in the adjusting position caused by a worker accidentally touching the stroke adjusting mechanism or the stopper mechanism, for example, during maintenance work, etc., a shift in the adjusting position due to incorrect operation of the worker, and a shift in the adjusting position caused by vibration, etc.

The present invention has been made to solve the above problem, and an object thereof is to provide a flow rate adjusting device which is designed with measures for making unintentional shifts in an adjusting position less likely to occur in a stroke adjusting mechanism and a stopper mechanism of a slow-leaking mechanism.

Solution to Problem

In order to solve the above problem, the present invention has adopted the following solutions.

A flow rate adjusting device according to the present invention includes: a housing having an inlet port at one end of a fluid passage and an outlet port at the other end of the fluid passage, the fluid passage being formed inside the housing; a valve body disposed so as to open and close the fluid passage; a stroke adjusting mechanism which adjusts minute opening of the valve body in a slow-leaking mechanism; a stopper mechanism which fixes an adjusting position of the minute opening; and a lock member which prevents motion of the stroke adjusting mechanism and the stopper mechanism. The lock member includes: a first insertion hole into which a substantially cylindrical adjusting operation part of the stroke adjusting mechanism is inserted; a second insertion hole into which a rod protruding upward from the housing is inserted; and an arm part which connects the first and second insertion holes.

According to this flow rate adjusting device, the lock member includes: the first insertion hole into which the substantially cylindrical adjusting operation part of the stroke adjusting mechanism is inserted; the second insertion hole into which the rod protruding upward from the housing is inserted; and the arm part which connects the first and second insertion holes. Mounting such a lock member causes the adjusting operation part to be inserted and fitted into the first insertion hole and, at the same time, the rod to be inserted and fitted into the second insertion hole which is connected by the arm part. Thus, unintentional shifts due to vibration, operation of rotating the lock member which surrounds an outer circumference of the adjusting operation part, etc. are prevented by engagement of the second insertion hole and the rod through the arm part.

In the above-described invention, it is preferable that the first insertion hole includes an annular part which protrudes to an upper side of the adjusting operation part at a predetermined insertion position, and thereby the adjusting operation part can be entirely covered except for an upper surface so as not to be exposed.

In this case, it is preferable that the lock member is made of resin and includes one or more slits which divide a wall surface of the annular part in a circumferential direction, and thereby the elastically deformed annular part can be brought into close contact with an outer circumferential surface of the adjusting operation part by optimizing an inner diameter of the annular part.

Advantageous Effects of Invention

According to the above-described present invention, it is possible to provide a flow rate adjusting device which is less likely to undergo such unintentional shifts in an adjusting position as affect the flow rate adjusting function, including a shift in the adjusting position caused by a worker accidentally touching the stroke adjusting mechanism or the stopper mechanism, a shift in the adjusting position due to incorrect operation of the worker, and a shift in the adjusting position caused by vibration, etc. in the flow rate adjusting device including the slow-leaking mechanism.

BRIEF DESCRIPTION OF DRAWINGS

FIG. 4 is a view showing a configuration example of a lock member used in the flow rate adjusting device shown in FIG. 1, in which FIG. 4(a) is a plan view, FIG. 4(b) is a left side view, and FIG. 4(c) is a cross-sectional view along the line A-A of (a).

FIG. 6 shows the flow rate adjusting device shown in FIG. 1, in which FIG. 6(a) is a longitudinal cross-sectional view showing a slow-leaking state of the slow-leaking mechanism with the lock member mounted, and FIG. 6(b) is an enlarged view of a major part showing a stroke (adjustment of a slow leakage amount) of the slow-leaking mechanism.

DESCRIPTION OF EMBODIMENTS

Hereinafter, one embodiment of a flow rate adjusting device including a slow-leaking mechanism according to the present invention will be described based on the drawings.

In a flow rate adjusting device 1 of the present embodiment shown in FIGS. 1 to 6, a housing 10, which forms an outer shape of the device, is shaped from a material such as resin or a highly chemical-resistant fluorine resin material, and a fluid inlet port 21 and a fluid outlet port 24 are formed on an outside of the housing. Although the housing 10 is divided into four blocks of 10a, 10b, 10c, and 10d in the shown configuration example, this is not intended to be limiting.

Figure 1:
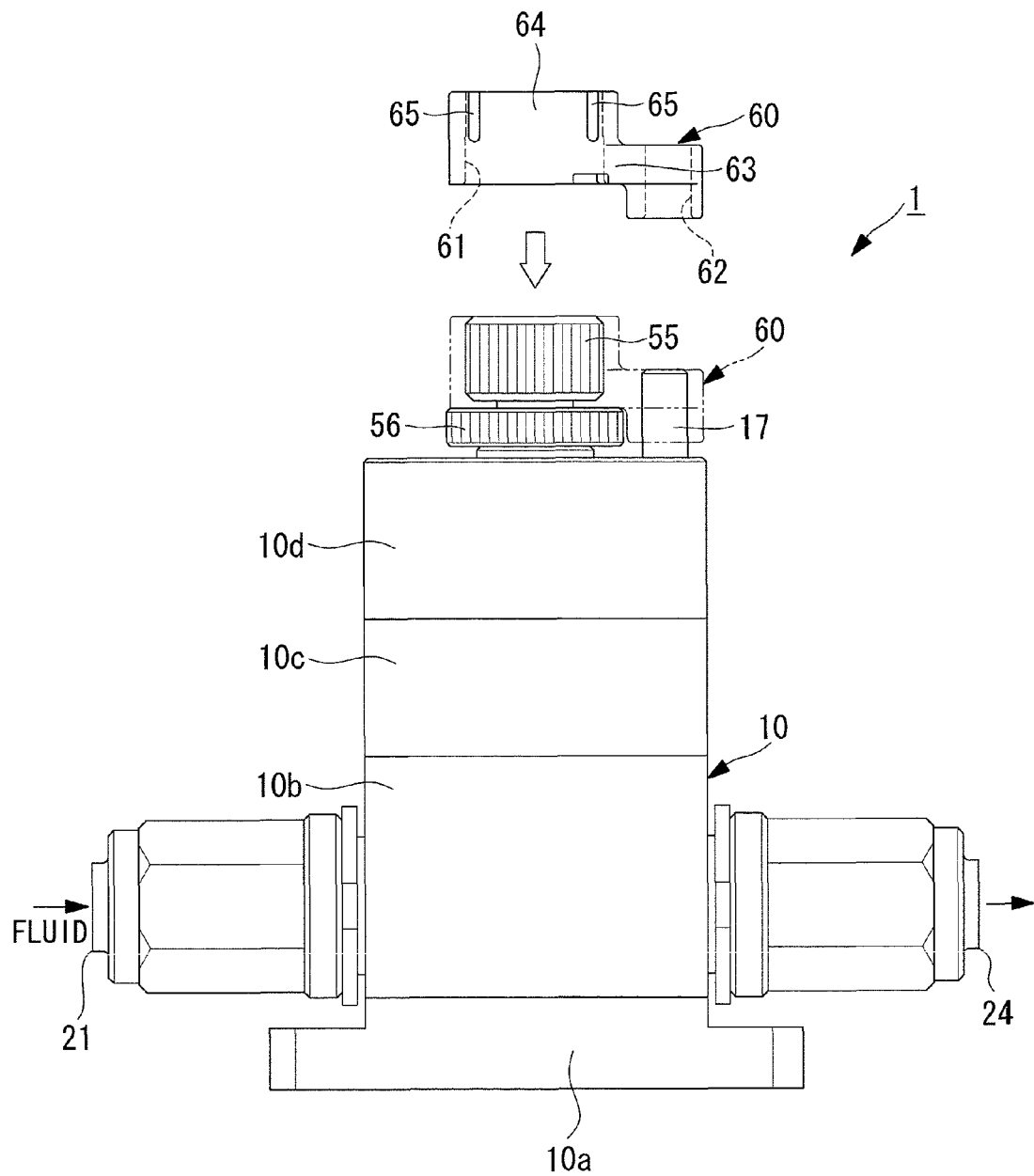
FIG. 1 is a front view showing one embodiment of a flow rate adjusting device according to the present invention.
Figure 2:
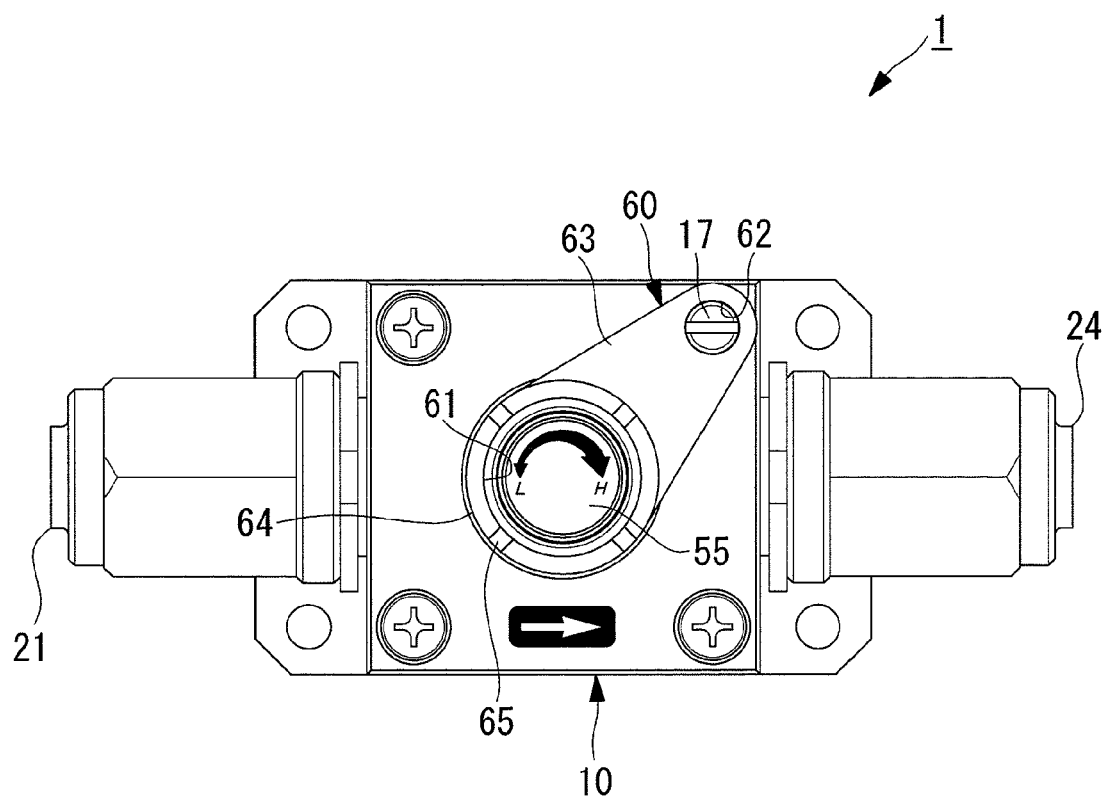
FIG. 2 is a plan view of the flow rate adjusting device shown in FIG. 1.
Figure 3:
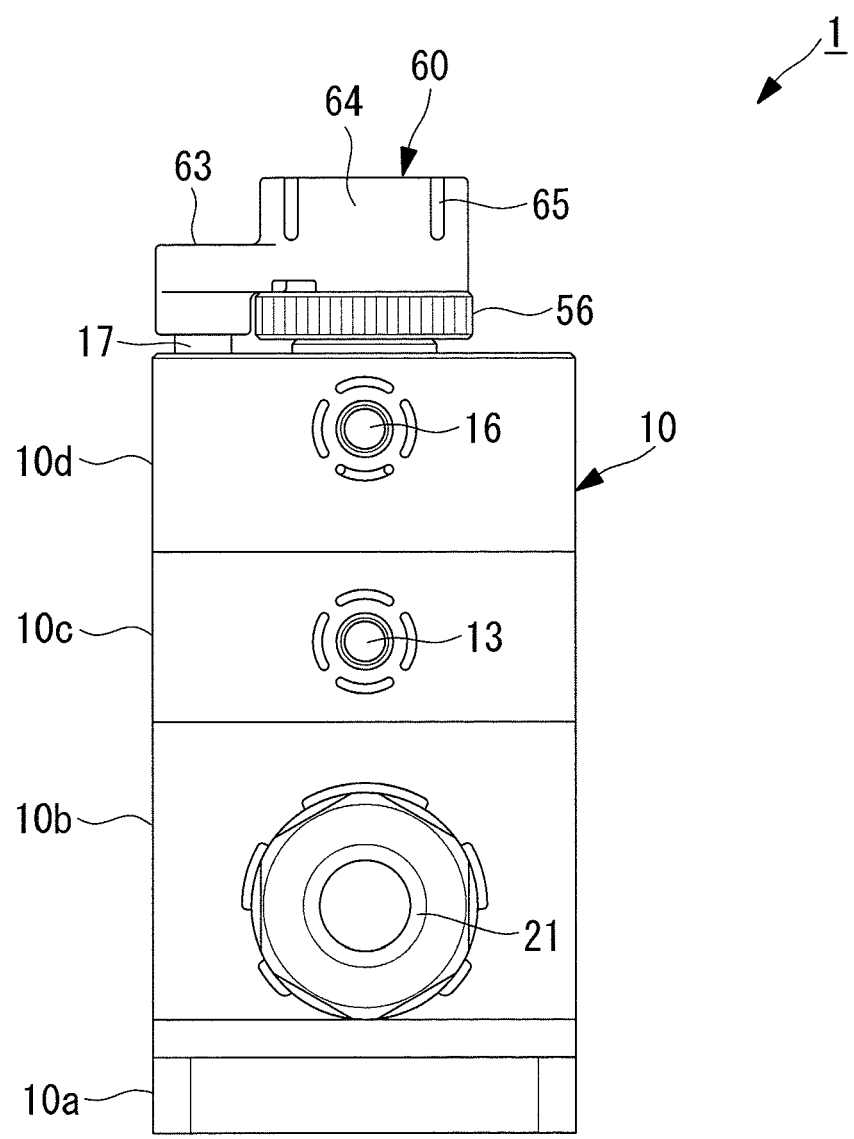
FIG. 3 is a left side view of the flow rate adjusting device shown in FIG. 1.
Figure 5:
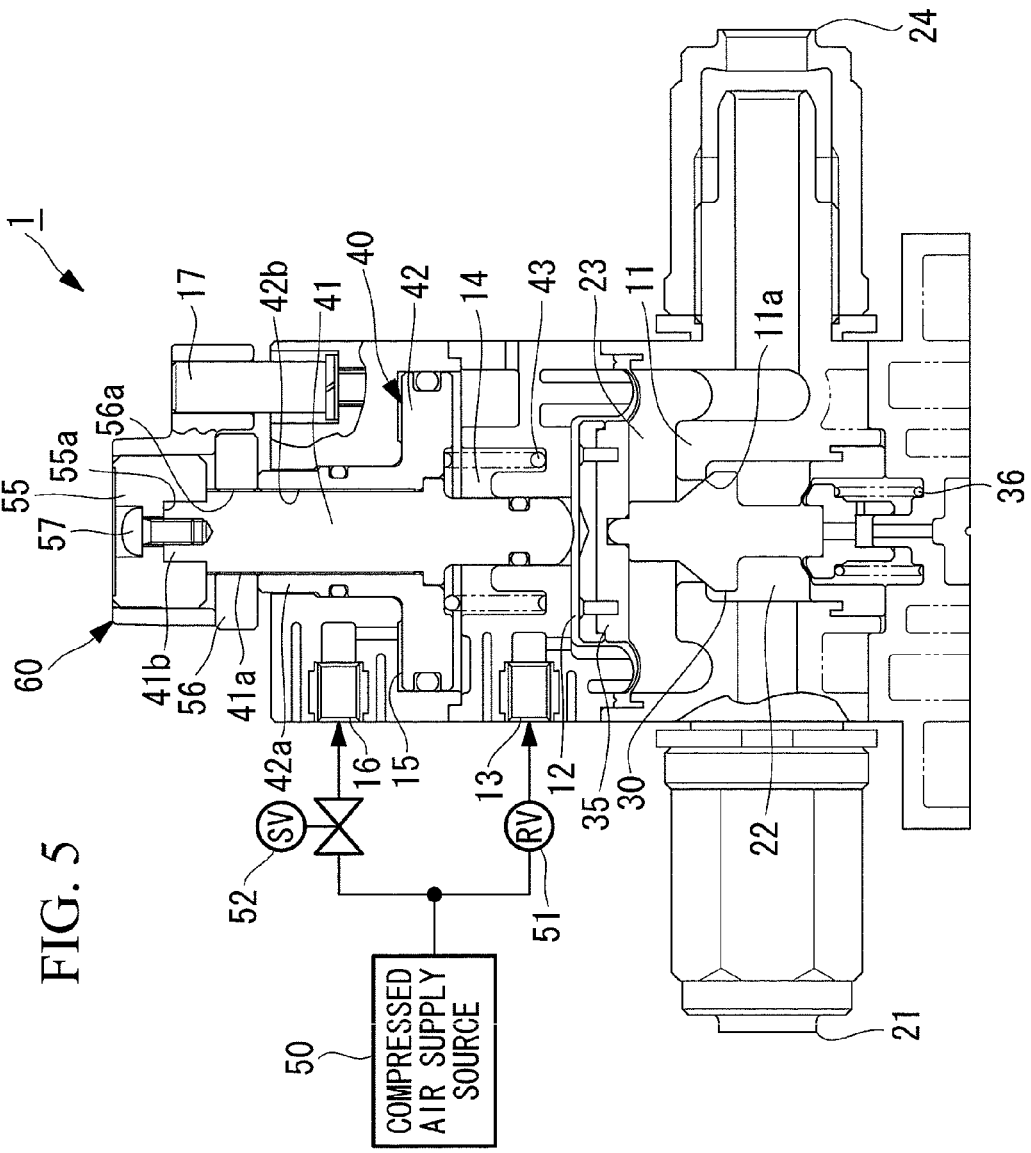
FIG. 5 is a longitudinal cross-sectional view showing the flow rate adjusting device shown in FIG. 1 in an initial state of a slow-leaking mechanism with a lock member mounted.
Figure 6:
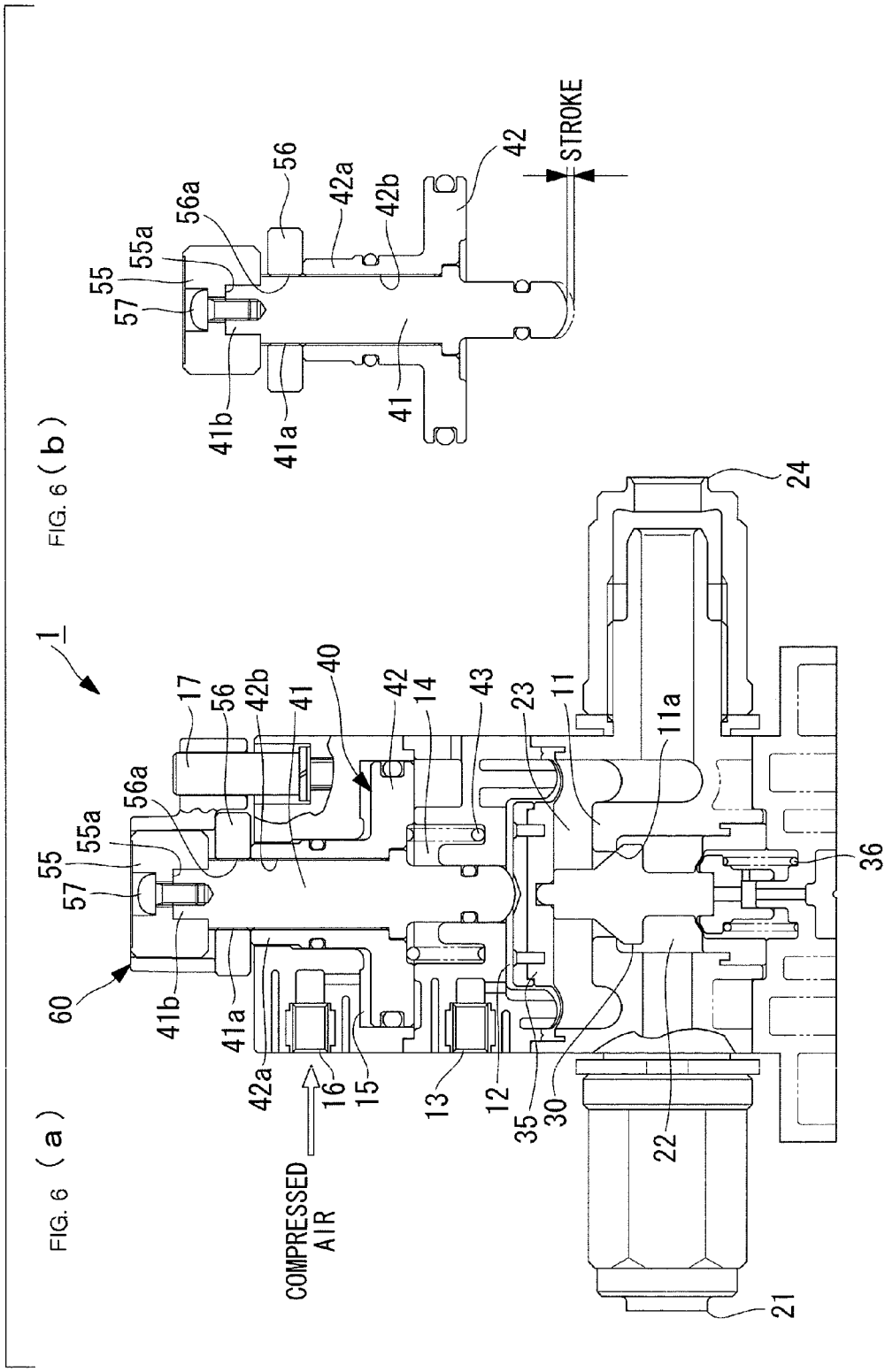

For example, as shown in FIG. 5, the housing 10 mainly encloses: a valve seat 11 having an opening face 11a which communicates with the inlet port 21; a valve body 30 which moves in an orthogonal direction (the vertical direction in FIG. 5) to the opening face 11a of the valve seat 11; a diaphragm 35 (pressure adjusting membrane) fixed to an upper end surface of the valve body 30; and a spring 36 which presses the valve body 30 against the valve seat 11.

A passage for the fluid to pass through is constituted of a first space 22 (commonly called a "valve chamber") which communicates from the inlet port 21 to the valve body 30, and a second space 23 which is located between the valve seat 11 and the diaphragm 35 and communicates with the outlet port 24.

A first pressure chamber 12 is formed on an opposite side to the second space 23 across the diaphragm 35, that is, on the upper side of the diaphragm 35 in the sheet of FIG. 5, and the pressure chamber 12 communicates with a pressure introduction port 13 formed on the upper part of the housing 10.

Although in the shown configuration example, air pressure which is adjusted to a desired pressure through a regulator 51 is supplied from a compressed air supply source 50 to the pressure introduction port 13, the pressure source is not intended to be limited to the compressed air.

The following further describes the configuration associated with the valve body 30 and the operation of the valve body 30.

The valve body 30 is movable in the vertical direction in FIG. 5, and pressed from below upward, that is, pressed against the valve seat 11, by the spring 36 provided under the valve body 30. This brings the opening face 11a of the valve seat 11 into close contact with the wall surface of the valve body 30, and thereby the valve seat 11 is closed.

Although the diaphragm 35 is fixed to the upper part of the valve body 30, for example, by screwing, this is not intended to be particularly limiting; in other cases, the valve body 30 and the diaphragm 35 may not be fixed together.

When air pressure is supplied from the pressure introduction port 13, the pressure chamber 12 is pressurized, and the diaphragm 35, having gained a force exceeding the elastic force of the spring 36, presses downward. This causes the valve body 30 fixed to the diaphragm 35 to separate from the valve seat 11 to open the opening face 11a of the valve seat 11, so that the fluid flows from the first space 22 into the second space 23.

In this case, since a travel distance (opening) in the vertical direction of the valve body 30 varies according to a degree to which the pressure chamber 12 is pressurized, flow rate of the fluid passing through the opening face 11a of the valve seat 11 can be adjusted. In other words, since the desired air pressure adjusted by the regulator 51 is supplied to the pressure chamber 12, the pressurizing force can be varied according to the air pressure.

As a result, since the fluid flows into the second space in accordance with the opening of the valve body 30 and this fluid flows from there toward the outlet port 24, the flow rate of the fluid supplied from the flow rate adjusting device 1 is thus adjusted.

As a driving source of the slow-leaking mechanism for preventing the valve body 30 from being fully closed, a piston 40 which operates on receiving supply of compressed air is provided on the upper side of the above-described diaphragm 35 and the pressure chamber 12.

The piston 40 is installed inside a piston chamber 14, which is a space (recess) formed at a position inside the housing 10 and on the upper side of the valve body 30 and the diaphragm 35, and an operating range of the piston 40 is restricted by upper and lower wall surfaces of the piston chamber 14. The piston 40 includes a vertical shaft 41, a disc 42 which is connected to the shaft 41 and acts as a pressure-receiving surface, and a spring 43 which biases the disc 42 upward.

The shaft 41 and the disc 42 are connected together by screwing an outside screw (male screw) 41a of the shaft 41 with an inside screw (female screw) 42b of a cylinder part 42a which is formed integrally with the disc 42.

A second pressure chamber 15 which supplies pressure and thereby actuates the piston 40 is formed on the upper side of the disc 42.

This pressure chamber 15 communicates with the pressure introduction port 16 which is formed at a position in the housing 10 above the pressure introduction port 13. Although in the shown configuration example, air pressure is supplied from the compressed air supply source 50 to the pressure introduction port 16 through a solenoid valve 52, the pressure source is not intended to be limited to the compressed air. The supply of air pressure to the pressure chamber 15 is on-off controlled by the solenoid valve 52.

More specifically, since a predetermined air pressure is supplied into the pressure chamber 15 upon opening (on) of the solenoid valve 52, the piston 40 overcomes the bias of the spring 43 and moves downward. This brings a lower end of the shaft 41 into contact with an upper end surface of the diaphragm 35, so that the valve body 30 together with the diaphragm 35 is pressed downward by a preset stroke amount. This depressing force of the piston 40 is set to a larger value than the upward bias (elastic force) of the above-described spring 36.

Therefore, even in a situation where the air pressure supplied from the pressure introduction port 13 is lost and the elastic force of the spring 36 prevails, the valve body 30 is prevented from being fully closed while the solenoid valve 52 is opened. As a result, the minute opening corresponding to the predetermined stroke is maintained.

The outside screw 41a is formed on the upper side of the piston 40, namely, on the upper end side of the shaft 41 protruding from the housing 10. And on the upper end side of the shaft 41, a dial operation part 55 of the stroke adjusting mechanism and a lock nut part 56 of the stopper mechanism are provided in order to adjust the stroke of the slow-leaking mechanism.

The dial operation part 55 is a member formed into a substantially cylindrical shape, and fixed, for example, by being mounted to a small diameter part 41b, which is provided on the upper end of the shaft 41 and has a non-circular cross-section, with a recessed part 55a having the same cross-sectional shape fitted so as to cover the small diameter part 41b, and thereafter being screwed by a screw 57 from above. However, the connecting/fixing structure of the dial operation part 55 and the shaft 41 is not intended to be particularly limited, as long as the shaft 41 can be interlocked with rotation operation of the dial operation part 55.

The lock nut part 56 is a nut-like member, of which an inside screw 56a is screwed with the outside screw 41a of the shaft 41, and this lock nut part 56 defines the stroke amount of the slow-leaking mechanism. More specifically, since rotating the dial operation part 55 in a desired direction causes the shaft 41 to move in an axial direction with respect to the cylinder part 42a and the lock nut part 56, a value of stroke shown in FIG. 6(b), namely, a protrusion length of the lower end of the shaft 41 from the lower surface of the disc 42 (stroke amount) can be adjusted.

As shown in FIG. 6(a), the larger the value of the stroke amount thus adjusted, the sooner the shaft contacts with the diaphragm 35, and accordingly, the minute opening of the valve body 30 set by the slow-leaking mechanism becomes larger.

Since screwing the cylinder part 42a and the lock nut part 56 with the shaft 41 functions to retain the shaft 41 as the stopper mechanism of a so-called double-nut system, the dial operation part 55 is fixed at an arbitrary position where it is screwed with the outside screw 41a formed on the shaft 41. The double-nut system of the present embodiment allows the shaft 41 to secure an axially long screw part by being screwed with the cylinder part 42a, whereby the reliability as the stopper mechanism is improved.

This means that, in a state where the piston 40 is not actuated vertically by the introduced air pressure, rotation operation of the dial operation part 55 in a desired direction causes the dial operation part 55 and the shaft 41 to move inside the cylinder part 42a, which is integral with the disc 42, in the axial direction (vertical direction) and be fixed at an arbitrary position by the double-nut system.

As a result, since the operating range of the piston 40 is restricted by the upper and lower wall surfaces inside the piston chamber 14, the stroke amount of the slow-leaking mechanism which is defined according to the adjusted protrusion amount of the shaft 41 is invariably maintained.

In the present embodiment, a lock cap 60, which is, for example, a resin formed part, is provided as a lock member for preventing motion of the dial operation part 55 and the lock nut part 56.

In sum, the flow rate adjusting device 1 of the present embodiment includes: the housing 10 having the inlet port 21 and the outlet port 24 at both ends of the fluid passage formed inside thereof; the valve body 30 disposed so as to open and close the fluid passage; the dial operation part (stroke adjusting mechanism) 55 which adjusts the minute opening of the valve body 30 in the slow-leaking mechanism; the lock nut part (stopper mechanism) 56 which fixes the adjusting position of the minute opening in the slow-leaking mechanism; and the lock cap (lock member) 60 which prevents the motion of the dial operation part 55 and the lock nut part 56.

The lock cap 60 includes: the first insertion hole 61 into which the substantially cylindrical dial operation part 55 provided on the upper end side of the lock nut part 56 is inserted; the second insertion hole 62 into which the rod 17 protruding upward from the housing 10 is inserted; and the arm part 63 which connects the first insertion hole 61 and the second insertion hole 62.

More specifically, the lock cap 60 includes: the first insertion hole 61 into which the substantially cylindrical dial operation part 55, which serves as the dial operation part 55 for adjusting the stroke of the slow-leaking mechanism, is inserted; the second insertion hole 62 into which the rod 17, which is provided so as to protrude upward from the upper surface of the housing 10, is inserted; and the arm part 63 which connects the first insertion hole 61 and the second insertion hole 62.

The first insertion hole 61 includes an annular part 64 which protrudes to an upper side of the dial operation part 55 at a predetermined insertion position. Providing this annular part 64 makes it possible to prevent the outer circumferential surface, which is an operation surface of the dial operation part 55, from being exposed, that is, to cover the entire surface of the dial operation part 55 except for the upper surface which is a non-operation surface.

The resin lock cap 60 includes one or more slits 65 which divide the wall surface of the annular part 64 in a circumferential direction. Accordingly, the annular part 64 which is elastically deformed in a mounted state can be brought into close contact with the outer circumferential surface of the dial operation part 55 by optimizing an inner diameter of the annular part 64, that is, by making the inner diameter slightly smaller than an outer diameter of the dial operation part 55.

The second insertion hole 62 has an inner diameter which is equal to or slightly larger than an outer diameter of the rod 17. Rotation of the lock cap 60 is prevented by inserting the rod 17, which is screwed into and fixed to the upper surface of the housing 10, into the insertion hole 62.

More specifically, mounting the lock cap 60 having the above-described configuration causes the dial operation part 55 to be inserted and fitted into the first insertion hole 61 and, at the same time, the rod 17 to be inserted and fitted into the second insertion hole 62 connected by the arm part 63. Thus, shifts in the adjusting position due to unintentional motion caused by vibration, operation of rotating the lock cap 60 surrounding the outer circumference of the dial operation part 55, etc. can be reliably prevented by engagement between the rod 17 and the second insertion hole 62 through the arm part 63.

With respect to the outer diameter of the dial operation part 55, a lower half of the above-described first insertion hole 61 is set to be slightly larger, whereas the annular part 64 on an upper half has a slightly smaller diameter. Due to such the first insertion hole 61, the rod 17 is already inserted in the insertion hole 62 at a point when the dial operation part 55 is inserted into the lower half of the first insertion hole 61, and the lock cap 60 can be positioned in this state.

Adopting the lock cap 60 having such a shape allows the annular part 64 and the dial operation part 55 to be fixed together after the first insertion hole 61, the second insertion hole 62, the dial operation part 55, and the rod 17 are positioned. Thus, by dividing the process into two steps of positioning and fixing, the lock cap 60 can be easily mounted without the dial operation part 55 being accidentally rotated during positioning.

According to the present embodiment thus configured, due to the lock cap 60 mounted on the stroke adjusting operation part of the slow-leaking mechanism, it is possible to provide a highly reliable device which can prevent such unintentional shifts in the adjusting position as affect the flow rate adjusting function, including a shift in the adjusting position by a worker accidentally touching the dial operation part 55 or the lock nut part 56, a shift in the adjusting position due to incorrect operation of the worker while trying to do other operation, and a shift in the adjusting position caused by vibration, etc.

The present invention is not intended to be limited to the above-described embodiment, and changes can be made appropriately without departing from the scope of the present invention.

The invention claimed is:

1. A flow rate adjusting device, comprising:
a housing having an inlet port at one end of a fluid passage and an outlet port at the other end of the fluid passage, the fluid passage being formed inside the housing;
a valve configured to move toward an opening face of a valve seat, the opening face communicating with the fluid passage;
a spring configured to generate a biasing force which presses the valve against the valve seat;
a pressure chamber configured to generate a pressure force which presses the valve in a direction that the valve moves away from the valve seat, the pressure chamber configured to be pressurized by a fluid supplied from a pressure supply source; and
a slow-leaking maintainer configured to maintain a minute opening between the valve and the valve seat at any moment when the biasing force generated by the spring overcomes the pressure force generated by the pressure chamber;
the slow-leaking maintainer includes:
a stroke adjuster configured to adjust minute opening of the valve in the slow-leaking maintainer;
a stopper configured to fix an adjusting position of the minute opening; and
a lock configured to prevent motion of the stroke adjuster and the stopper, wherein the lock includes:
a first insertion hole into which a substantially cylindrical adjusting operation part of the stroke adjuster is inserted;
a second insertion hole into which a rod protruding upward from the housing is inserted, rotation of the lock being prevented by the insertion of the rod into the second insertion hole; and
an arm which connects the first and second insertion holes.

2. A flow rate adjusting device, comprising:
a housing having an inlet port at one end of a fluid passage and an outlet port at the other end of the fluid passage, the fluid passage being formed inside the housing;
a valve configured to move toward an opening face of a valve seat, the opening face communicating with the fluid passage;
a spring configured to generate a biasing force which presses the valve against the valve seat;
a pressure chamber configured to generate a pressure force which presses the valve in a direction that the valve moves away from the valve seat, the pressure chamber configured to be pressurized by a fluid supplied from a pressure supply source; and
a slow-leaking maintainer configured to maintain a minute opening between the valve and the valve seat at any moment when the biasing force generated by the spring overcomes the pressure force generated by the pressure chamber, wherein:
the slow-leaking maintainer includes:
a stroke adjuster configured to adjust minute opening of the valve in the slow-leaking maintainer;
a stopper configured to fix an adjusting position of the minute opening; and
a lock configured to prevent motion of the stroke adjuster and the stopper, wherein the lock includes:
a first insertion hole into which a substantially cylindrical adjusting operation part of the stroke adjuster is inserted;
a second insertion hole into which a rod protruding upward from the housing is inserted; and
an arm which connects the first and second insertion holes; and
the first insertion hole comprises an annulus which protrudes to an upper side of the adjusting operation part at a predetermined insertion position; and
the annulus covers an entire surface of the adjusting operation part except for a non-operation surface.

3. The flow rate adjusting device according to claim 2, wherein
the lock is made of resin, and comprises one or more slits which divide a wall surface of the annulus in a circumferential direction.

\* \* \* \* \*

UNITED STATES PATENT AND TRADEMARK OFFICE
CERTIFICATE OF CORRECTION

PATENT NO. : 9,453,587 B2
APPLICATION NO. : 14/090144
DATED : September 27, 2016
INVENTOR(S) : H. Igarashi et al.

Page 1 of 1

It is certified that error appears in the above-identified patent and that said Letters Patent is hereby corrected as shown below:

On the Title Page

Abstract, Column 2, Line 3, please change "adjusts minute" to -- adjusts a minute --

In the Claims

Column 7, Line 53 (Claim 1, Line 21) please change "adjust minute" to -- adjust the minute --
Column 8, Line 32 (Claim 2, Line 21) please change "adjust minute" to -- adjust the minute --

Signed and Sealed this
Fifth Day of June, 2018

Andrei Iancu
*Director of the United States Patent and Trademark Office*